(12) United States Patent
Su et al.

(10) Patent No.: US 8,506,841 B2
(45) Date of Patent: Aug. 13, 2013

(54) PHOTOPOLYMERIZABLE LIQUID CRYSTAL MIXTURE AND MANUFACTURING METHOD OF PHOTOPOLYMERIZABLE LIQUID CRYSTAL

(75) Inventors: Chun-Wei Su, New Taipei (TW); Jan-Tien Lien, Keelung (TW); Hui-Chen Lin, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 128 days.

(21) Appl. No.: 13/225,564

(22) Filed: Sep. 6, 2011

(65) Prior Publication Data
US 2012/0313039 A1    Dec. 13, 2012

(30) Foreign Application Priority Data
Jun. 9, 2011    (TW) .............................. 100120092 A

(51) Int. Cl.
*C09K 19/52*    (2006.01)
*C09K 19/54*    (2006.01)

(52) U.S. Cl.
USPC ................................. 252/299.01; 252/299.5

(58) Field of Classification Search
CPC ............................................... C09K 2019/0448
USPC ........... 428/1.1; 252/299.01, 299.5; 349/36, 349/37, 186
See application file for complete search history.

(56) References Cited

U.S. PATENT DOCUMENTS

| | | | |
|---|---|---|---|
| 7,824,571 B2 | 11/2010 | Ishizaki | |
| 2010/0053527 A1* | 3/2010 | Hsieh et al. | 349/124 |
| 2010/0238382 A1 | 9/2010 | Hsu | |
| 2012/0081652 A1* | 4/2012 | Su et al. | 349/191 |
| 2012/0257146 A1* | 10/2012 | Su et al. | 349/93 |

FOREIGN PATENT DOCUMENTS

TW    200944901 A    11/2009

* cited by examiner

*Primary Examiner* — Shean C Wu
(74) *Attorney, Agent, or Firm* — Winston Hsu; Scott Margo

(57) ABSTRACT

A photopolymerizable liquid crystal mixture includes a first photopolymerizable monomer, a second photopolymerizable monomer, a first photoinitiator, a second photoinitiator, and a liquid crystal material. A manufacturing method of photopolymerizable liquid crystal includes the following steps. A first light source is provided to irradiate the photopolymerizable liquid crystal mixture without providing a driving voltage, for inducing photopolymerization of the first photoinitiator and the first photopolymerizable monomer. A second light source is provided to irradiate the photopolymerizable liquid crystal mixture without providing a driving voltage, for inducing photopolymerization of the second photoinitiator and the second photopolymerizable monomer and aligning the liquid crystal material along a direction.

12 Claims, 7 Drawing Sheets

PHOTOPOLYMERIZABLE LIQUID CRYSTAL MIXTURE AND MANUFACTURING METHOD OF PHOTOPOLYMERIZABLE LIQUID CRYSTAL

BACKGROUND OF THE INVENTION

1. Field of the Invention

The present invention relates to a photopolymerizable liquid crystal mixture and a manufacturing method of a photopolymerizable liquid crystal, and more particularly, to a photopolymerizable liquid crystal mixture and a manufacturing method of a photopolymerizable liquid crystal where a photopolymerization and an alignment of the photopolymerizable liquid crystal are completed without providing a driving voltage.

2. Description of the Prior Art

In the conventional manufacturing process of LCD devices, an alignment layer is formed by performing a rubbing process on a polyimide (PI) layer. In the rubbing process, specific directions for aligning liquid crystal are defined on a surface of the PI layer by contacting and rubbing with a roller. However, because the roller has to directly contact a surface of the substrate, a uniformity of the rubbing process may be influenced by a contour of the surface and the performance of the rubbing process may be affected too. For solving problems of the conventional aligning method and lowering manufacturing cost, methods of aligning liquid crystal without a PI layer have been studied recently.

Please refer to FIG. 1 and FIG. 2. FIG. 1 and FIG. 2 are schematic diagrams illustrating a manufacturing method of photopolymerizable liquid crystal according to a prior art. As shown in FIG. 1, a photopolymerizable liquid crystal mixture 10 is disposed between two transparent substrates 18. The photopolymerizable liquid crystal mixture 10 includes a photoinitiator 12, a photopolymerizable monomer 14 and a liquid crystal material 16. As shown in FIG. 2, under an irradiation of a light source L, photopolymerization of the photoinitiator 12 and the photopolymerizable monomer 14 is induced. Simultaneously, a driving voltage V is provided between the transparent substrates 18 for aligning the liquid crystal material 16 along a direction. However, the conditions of the driving voltage may be different for different panels with different sizes. It is relatively difficult to optimize the conditions of the driving voltage, and lots of manpower may be required for studying it.

SUMMARY OF THE INVENTION

It is one of the objectives of the present invention to provide a photopolymerizable liquid crystal mixture and a manufacturing method of a photopolymerizable liquid crystal for simplifying a manufacturing process of the photopolymerizable liquid crystal.

To achieve the purposes described above, a preferred embodiment of the present invention provides a photopolymerizable liquid crystal mixture. The photopolymerizable liquid crystal mixture includes a first photopolymerizable monomer, a second photopolymerizable monomer, a first photoinitiator, a second photoinitiator, and a liquid crystal material. Photopolymerization of the first photopolymerizable monomer is induced by the first photoinitiator under an irradiation of light with a first wavelength. Photopolymerization of the second photopolymerizable monomer is induced by the second photoinitiator under an irradiation of light with a second wavelength. The first wavelength is different from the second wavelength.

To achieve the purposes described above, a preferred embodiment of the present invention provides a manufacturing method of a photopolymerizable liquid crystal. The manufacturing method of the photopolymerizable liquid crystal includes the following steps. A photopolymerizable liquid crystal mixture is provided. The photopolymerizable liquid crystal mixture includes a first photopolymerizable monomer, a second photopolymerizable monomer, a first photoinitiator, a second photoinitiator, and a liquid crystal material. A first light source is provided to irradiate the photopolymerizable liquid crystal mixture without providing a driving voltage for inducing photopolymerization of the first photoinitiator and the first photopolymerizable monomer. A second light source is provided to irradiate the photopolymerizable liquid crystal mixture without providing a driving voltage for inducing photopolymerization of the second photoinitiator and the second photopolymerizable monomer and aligning the liquid crystal material along a direction.

According to the photopolymerizable liquid crystal mixture and the manufacturing method of the photopolymerizable liquid crystal of the present invention, the photopolymerization and the alignment of the photopolymerizable liquid crystal may be done by the irradiation from the first light source and the second light source without providing a driving voltage. The conventional manufacturing method of the photopolymerizable liquid crystal may then be simplified.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
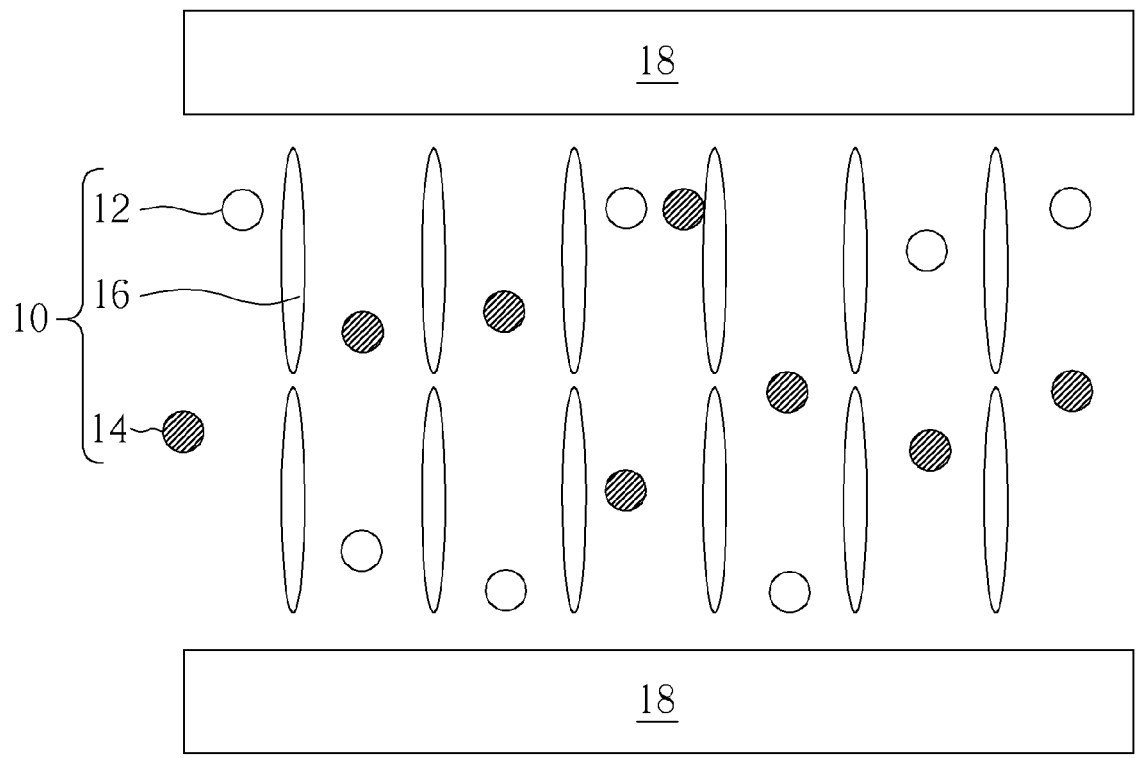
FIG. 1 and FIG. 2 are schematic diagrams illustrating a manufacturing method of photopolymerizable liquid crystal according to a prior art.
Figure 2:
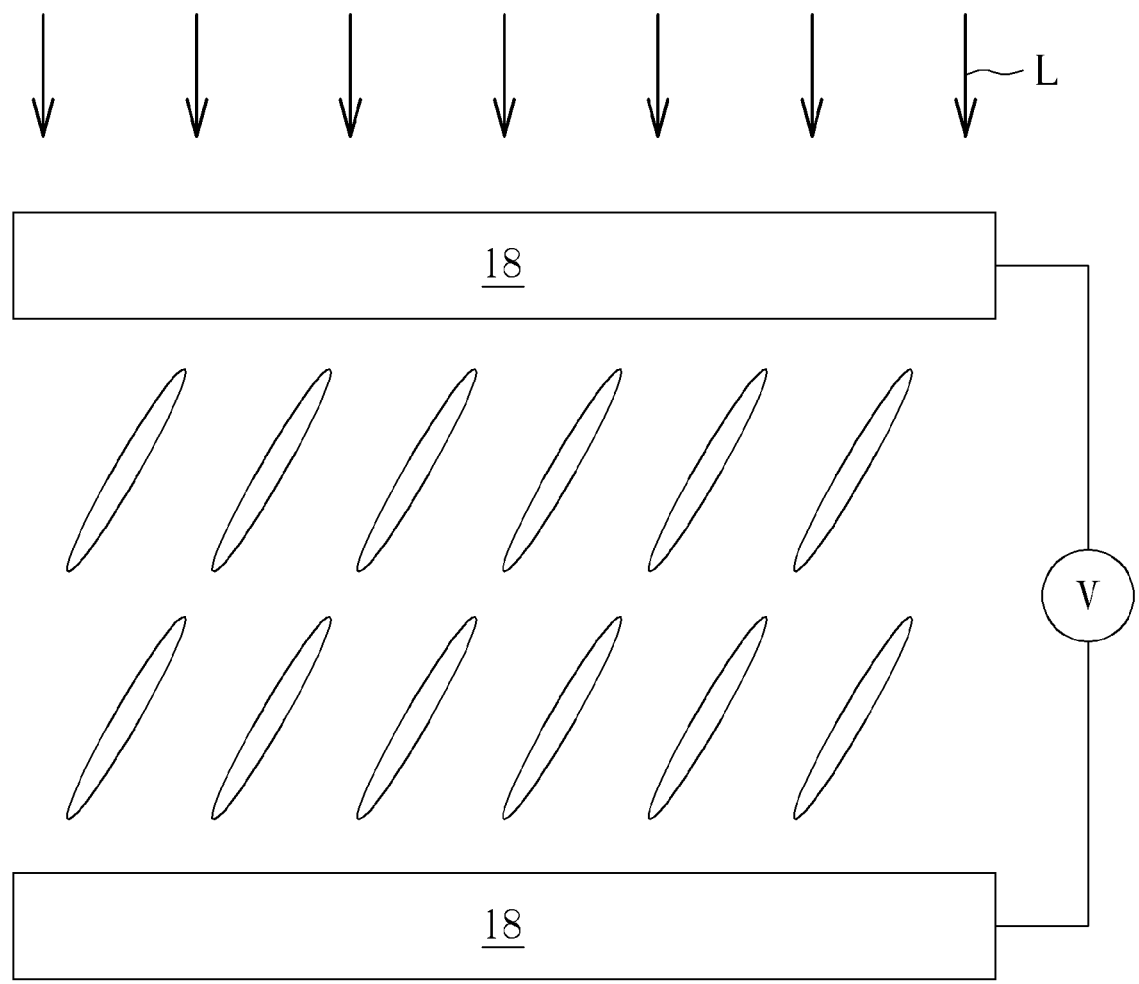
Figure 3:
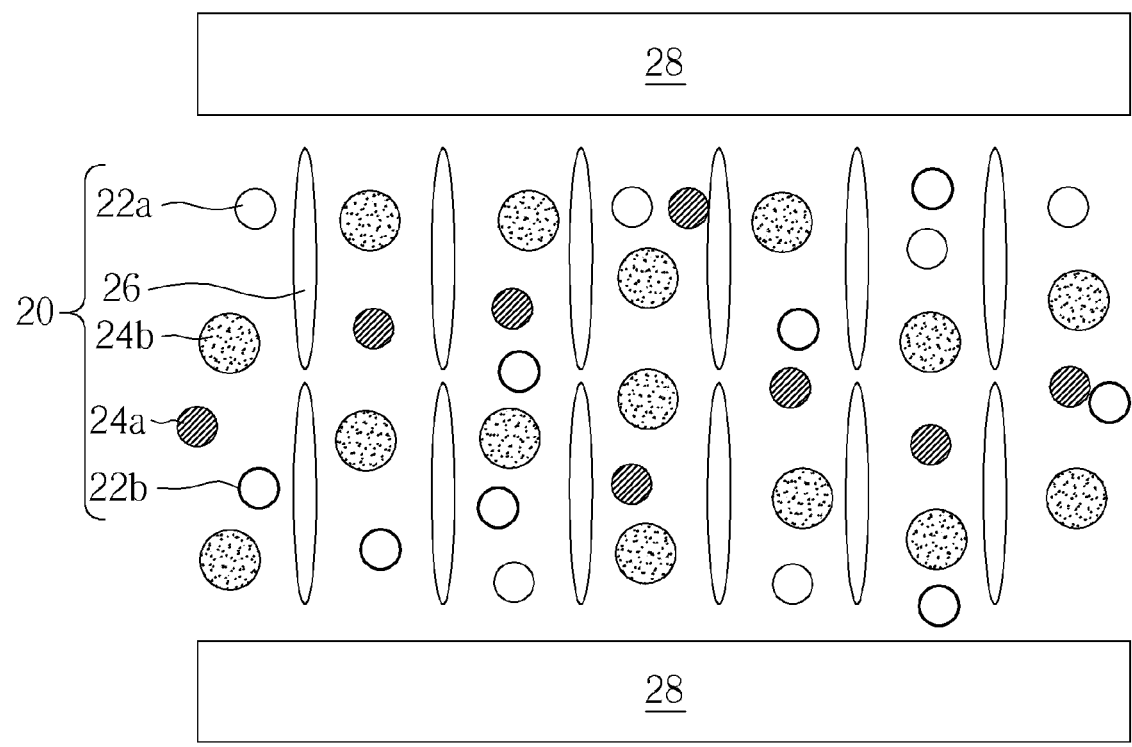
FIGS. 3-5 are schematic diagrams illustrating a manufacturing method of photopolymerizable liquid crystal according to a preferred embodiment of the present invention.
Figure 4:
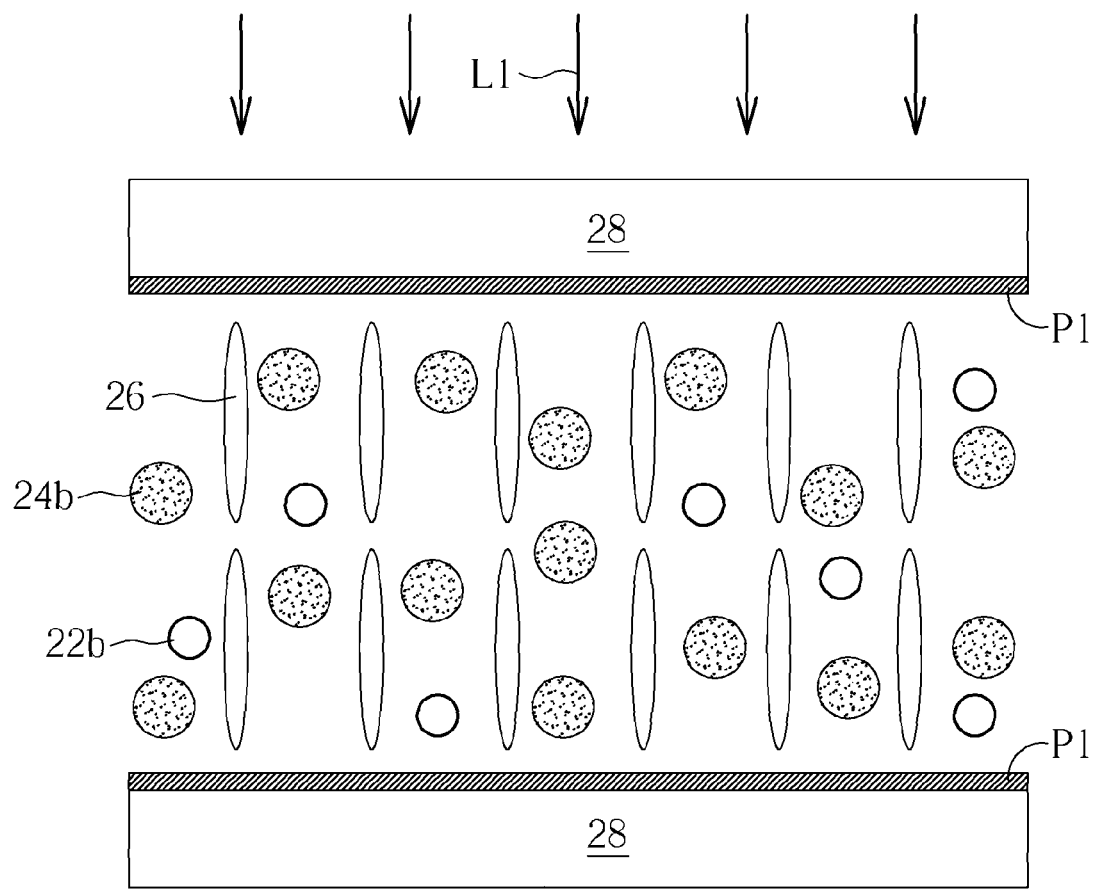
Figure 5:
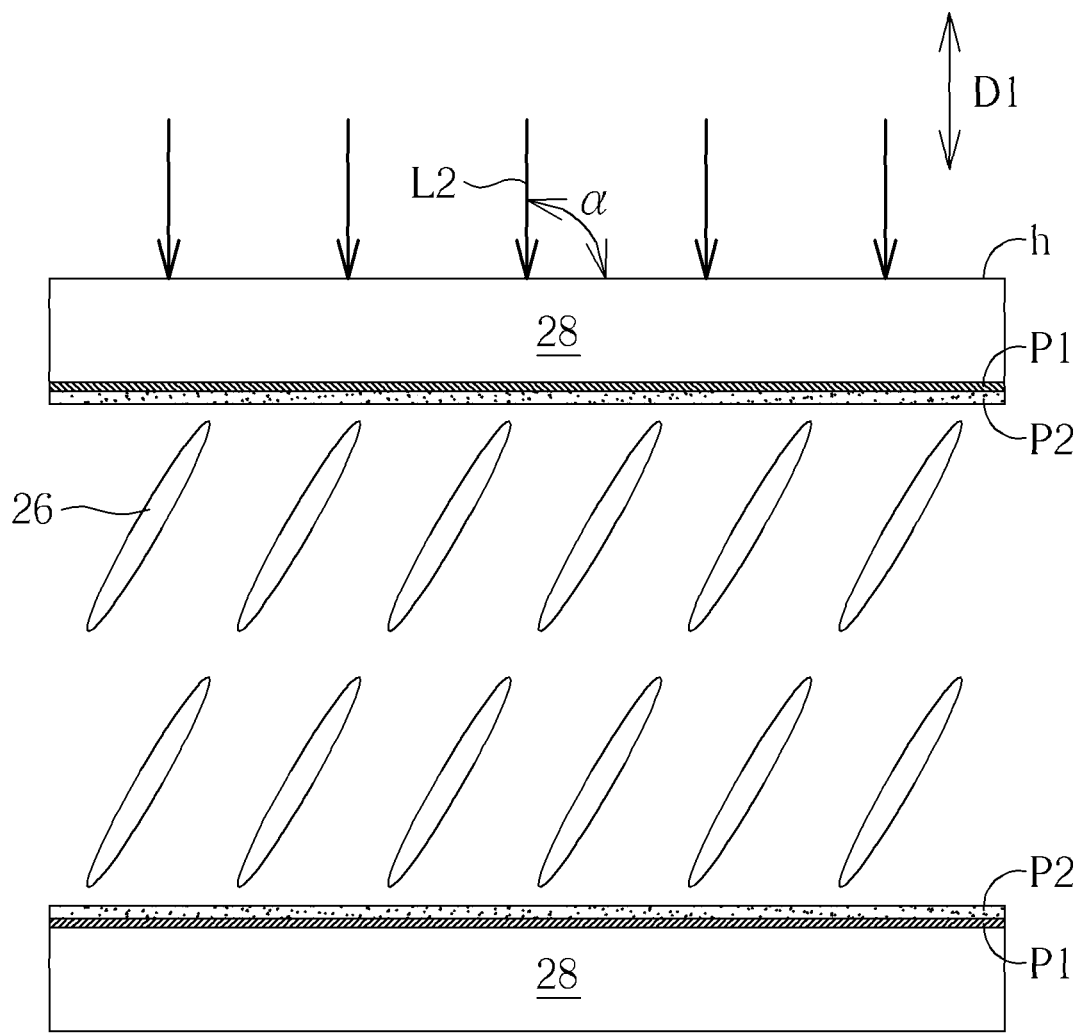

Please refer to FIGS. 3-5. FIGS. 3-5 are schematic diagrams illustrating a manufacturing method of photopolymerizable liquid crystal according to a preferred embodiment of the present invention. As shown in FIG. 3, a photopolymerizable liquid crystal mixture 20 is provided in this embodiment. The photopolymerizable liquid crystal mixture 20 is disposed between two transparent substrates 28. In other words, space between the two transparent substrates 28 is filled with the photopolymerizable liquid crystal mixture 20. The photopolymerizable liquid crystal mixture 20 includes a first photopolymerizable monomer 24a, a second photopolymerizable monomer 24b, a first photoinitiator 22a, a second photoinitiator 22b, and a liquid crystal material 26. In this embodiment, the first photopolymerizable monomer 24a may include materials such as dodecyl acrylate, which is shown in formula 1 shown below, but not limited thereto.

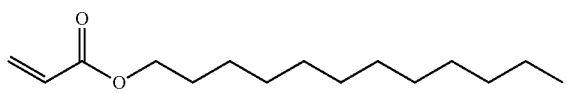

(1)

The second photopolymerizable monomer 24b may include materials such as derivatives of cinnamic acid, which is shown in formula 2 shown below, but not limited thereto.

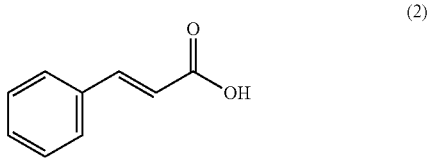 [SMILES: O=C(O)/C=C/c1ccccc1]

(2)

Additionally, in this embodiment, photopolymerization of the first photopolymerizable monomer 24a may be induced by the first photoinitiator 22a under an irradiation of light with a first wavelength, and photopolymerization of the second photopolymerizable monomer 24b may be induced by the second photoinitiator 22b under an irradiation of light with a second wavelength. The first wavelength is different from the second wavelength. In this embodiment, the mixing ratios of each material in the photopolymerizable liquid crystal mixture 20 are listed in Table 1.

TABLE 1

| First Photo-initiator | Second Photo-initiator | First Photopolymerizable Monomer | Second Photopolymerizable Monomer | Liquid Crystal Material |
|---|---|---|---|---|
| 0.1~2% | 0.1~2% | 5~30% | 10~40% | 100% |

As shown in Table 1, a concentration of the first photopolymerizable monomer 24a in the liquid crystal material 26 is between 5% and 30%, a concentration of the second photopolymerizable monomer 24b in the liquid crystal material 26 is between 10% and 40%, a concentration of the first photoinitiator 22a in the liquid crystal material 26 is between 0.1% and 2%, and a concentration of the second photoinitiator 22b in the liquid crystal material 26 is between 0.1% and 2%, but the mixing ratio of each material in the photopolymerizable liquid crystal mixture 20 is not limited to this.

As shown in FIG. 4, a first light source L1 is provided to irradiate the photopolymerizable liquid crystal mixture 20 without providing a driving voltage. In this embodiment, the first light source L1 may include a non-polarized UV light source. Under the irradiation of the first light source L1, the photopolymerization of the first photopolymerizable monomer 24a and the first photoinitiator 22a may be induced, and a first polymerization layer P1 may be formed on each surface of the transparent substrate 28. Additionally, in this embodiment, a wavelength of the first light source L1 is preferably about 365 nm, and an irradiation dose from the first light source L1 is preferably between 15 joules and 35 joules, but not limited thereto.

Subsequently, as shown in FIG. 5, a second light source L2 is provided without providing a driving voltage. In this embodiment, the second light source L2 may include a polarized UV light source, and a wavelength of the second light source L2 is different from the wavelength of the first light source L1 mentioned above. In addition, an included angle α between an irradiating direction D1 of the second light source L2 and a surface h of the transparent substrate 28 is about 90 degrees, i.e. the second light source L2 irradiates perpendicularly to the transparent substrate 28, but not limited thereto. Under the irradiation of the second light source L2, the photopolymerization of the second photopolymerizable monomer 24b and the second photoinitiator 22b may be induced, and a second polymerization layer P2 may be formed on each of the first polymerization layers P1. During the photopolymerization of the second photopolymerizable monomer 24b, the liquid crystal material 26 may be aligned along a direction because of the polarization property of the UV light source. In other words, the photopolymerization and the alignment of the photopolymerizable liquid crystal may be done after the irradiation from the second light source L2. In this embodiment, a wavelength of the second light source L2 is preferably between 313 nm and 320 nm, and an irradiation dose from the second light source L2 is preferably between 100 millijoules and 1500 millijoules, but not limited thereto.

Figure 6:
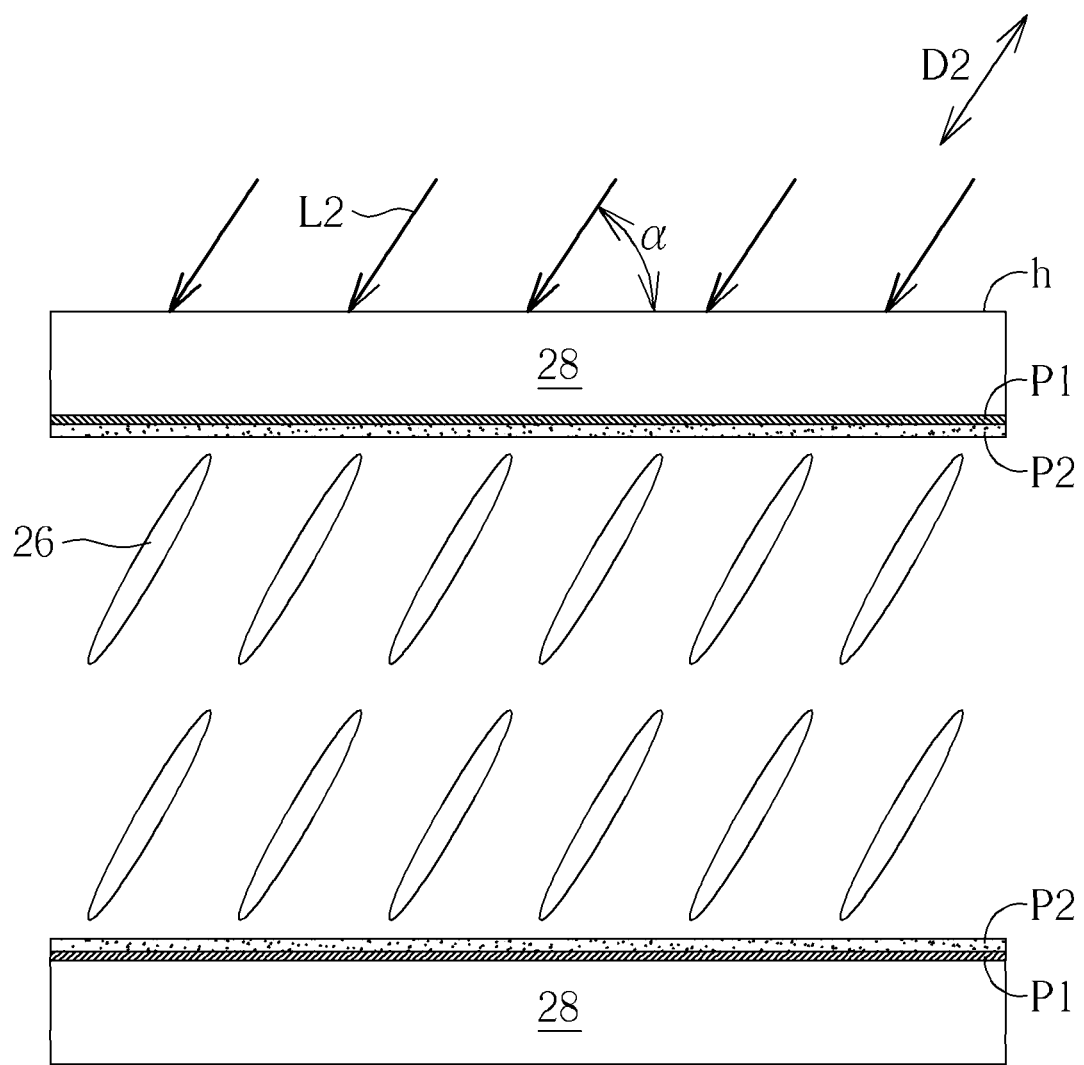
FIG. 6 and FIG. 7 are schematic diagrams illustrating an irradiating direction of a second light source according to another embodiment of the present invention.
Figure 7:
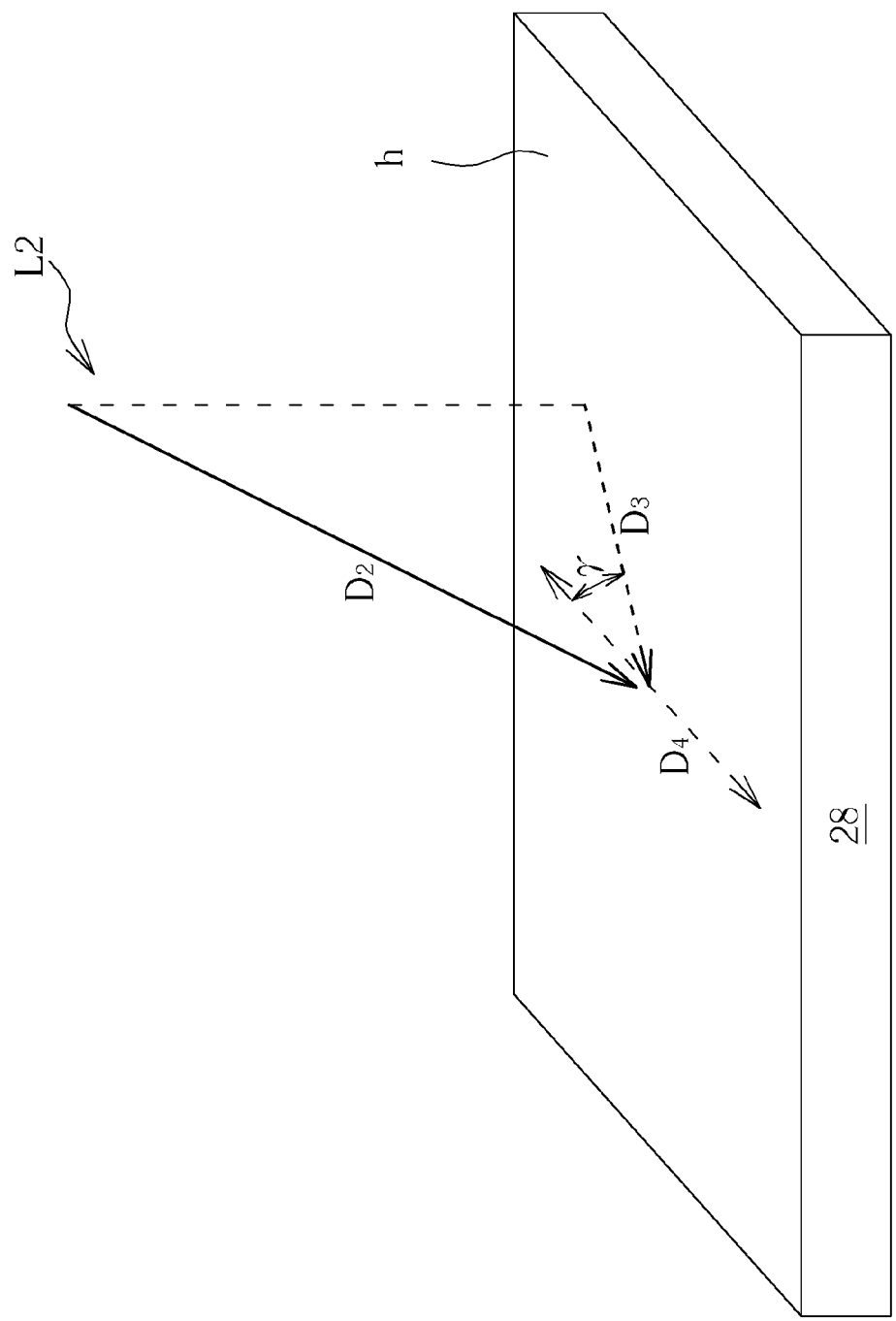

Please refer to FIG. 6 and FIG. 7. FIG. 6 and FIG. 7 are schematic diagrams illustrating an irradiating direction of a second light source according to another embodiment of the present invention. As shown in FIG. 6, an included angle α between an irradiating direction D2 of the second light source L2 and a surface h of the transparent substrate 28 is between 0 degree and 180 degrees, i.e. the second light source L2 may irradiate the transparent substrate 28 in different angles and the second light source L2 is not limited to be perpendicular to the transparent substrate 28 as described above. As shown in FIG. 7, an azimuth angle γ exists between the irradiating direction D2 of the second light source L2 and the surface h of the transparent substrate 28. The azimuth angle γ is an included angle between a projective direction D3 of the second light source L2 on the transparent substrate 28 and a side direction D4 parallel to the transparent substrate 28. In this embodiment, the azimuth angle γ is between zero degrees and 360 degrees. Different photopolymerization conditions of the second photopolymerizable monomer 24b may be induced by different polarization properties and different irradiation directions of the light source, and the liquid crystal materials 26 may also be aligned along different directions.

To summarize the above descriptions, according to the photopolymerizable liquid crystal mixture and the manufacturing method of the photopolymerizable liquid crystal of the present invention, the photopolymerization of the first photopolymerizable monomer may be induced under the irradiation of the non-polarized first light source without providing a driving voltage, the photopolymerization of the second photopolymerizable monomer may then be induced under the irradiation of the polarized second light source, and the liquid crystal material may be aligned along a direction simultaneously. In other words, the photopolymerization and the alignment of the photopolymerizable liquid crystal may be done after the radiation of the second light source. In the present invention, hours and costs for optimizing the conditions of the driving voltage may be reduced or eliminated as compared with the conventional manufacturing method of the photopolymerizable liquid crystal. The purposes of process simplification and process time reduction may then be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A photopolymerizable liquid crystal mixture, comprising:
- a first photopolymerizable monomer, comprising dodecyl acrylate;
- a second photopolymerizable monomer, comprising derivatives of cinnamic acid, and the second photopolymerizable monomer being different from the first photopolymerizable monomer;
- a first photoinitiator;
- a second photoinitiator, being different from the first photoinitiator; and
- a liquid crystal material;
- wherein photopolymerization of the first photopolymerizable monomer is induced by the first photoinitiator under an irradiation of light with a first wavelength, photopolymerization of the second photopolymerizable monomer is induced by the second photoinitiator under an irradiation of light with a second wavelength, and the first wavelength is different from the second wavelength.

2. The photopolymerizable liquid crystal mixture of claim 1, wherein a concentration of the first photopolymerizable monomer in the liquid crystal material is between 5% and 30%.

3. The photopolymerizable liquid crystal mixture of claim 1, wherein a concentration of the second photopolymerizable monomer in the liquid crystal material is between 10% and 40%.

4. The photopolymerizable liquid crystal mixture of claim 1, wherein
- a concentration of the first photoinitiator in the liquid crystal material is between 0.1% and 2%.

5. The photopolymerizable liquid crystal mixture of claim 1, wherein a concentration of the second photoinitiator in the liquid crystal material is between 0.1% and 2%.

6. A manufacturing method of a photopolymerizable liquid crystal, comprising:
- providing a photopolymerizable liquid crystal mixture, wherein the photopolymerizable liquid crystal mixture comprises:
  - a first photopolymerizable monomer, comprising dodecyl acrylate;
  - a second photopolymerizable monomer, comprising derivatives of cinnamic acid, and the second photopolymerizable monomer being different from the first photopolymerizable monomer;
  - a first photoinitiator;
  - a second photoinitiator, being different from the first photoinitiator; and
  - a liquid crystal material;
- providing a first light source to irradiate the photopolymerizable liquid crystal mixture without providing any driving voltage, for inducing photopolymerization of the first photoinitiator and the first photopolymerizable monomer; and
- providing a second light source to irradiate the photopolymerizable liquid crystal mixture without providing any driving voltage, for inducing photopolymerization of the second photoinitiator and the second photopolymerizable monomer and aligning the liquid crystal material along a direction;
- wherein a wavelength of the first light source is different from a wavelength of the second light source.

7. The manufacturing method of claim 6, wherein the first light source includes a non-polarized UV light source.

8. The manufacturing method of claim 6, wherein the second light source includes a polarized UV light source.

9. The manufacturing method of claim 6, wherein the photopolymerizable liquid crystal mixture is disposed between two parallel transparent substrates disposed opposite to each other.

10. The manufacturing method of claim 9, wherein the second light source irradiates the photopolymerizable liquid crystal mixture from a surface of one of the two transparent substrates.

11. The manufacturing method of claim 10, wherein an included angle between an irradiating direction of the second light source and the surface of the transparent substrate is between 0 degree and 180 degrees.

12. The manufacturing method of claim 10, wherein an azimuth angle between an irradiating direction of the second light source and the surface of the transparent substrate is between 0 degree and 360 degrees.

* * * * *